(12) United States Patent
Liao (10) Patent No.: US 8,421,841 B2
(45) Date of Patent: Apr. 16, 2013

(54) MULTI-MEDIA CONTROLLING SYSTEM, DEVICE AND METHOD FOR CONTROLLING DATA TRANSMISSION AND PROCESSING

(75) Inventor: Shuzhao Liao, Guangdong (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 623 days.

(21) Appl. No.: 12/631,128

(22) Filed: Dec. 4, 2009

(65) Prior Publication Data

US 2010/0079574 A1 Apr. 1, 2010

Related U.S. Application Data

(63) Continuation of application No. PCT/CN2008/071181, filed on Jun. 4, 2008.

(30) Foreign Application Priority Data

Jun. 5, 2007 (CN) .......................... 2007 1 0110572

(51) Int. Cl.
*H04N 7/14* (2006.01)
(52) U.S. Cl.
USPC .................................... 348/14.09; 348/14.05
(58) Field of Classification Search ............... 348/14.01, 348/14.04, 14.05, 14.09, 14.12
See application file for complete search history.

(56) References Cited

U.S. PATENT DOCUMENTS

| | | |
|---|---|---|
| 6,335,927 B1 | 1/2002 | Elliott et al. |
| 2002/0044201 A1* | 4/2002 | Alexander et al. ......... 348/14.08 |
| 2002/0138842 A1* | 9/2002 | Chong et al. ................ 725/87 |
| 2004/0107450 A1 | 6/2004 | Kodama |
| 2004/0116183 A1 | 6/2004 | Prindle |
| 2006/0077252 A1* | 4/2006 | Bain et al. ................. 348/14.09 |
| 2006/0092269 A1 | 5/2006 | Baird et al. |
| 2007/0121678 A1 | 5/2007 | Brooks et al. |
| 2011/0205333 A1* | 8/2011 | Wu et al. ................... 348/14.08 |

FOREIGN PATENT DOCUMENTS

| | | |
|---|---|---|
| CN | 1435785 A | 8/2003 |
| CN | 1741607 A | 3/2006 |
| WO | WO 99/03040 A1 | 1/1999 |
| WO | WO 9912349 A1 | 3/1999 |
| WO | WO 03/077512 A1 | 9/2003 |

OTHER PUBLICATIONS

State Intellectual Property Office of the People's Republic of China, English Translation of Written Opinion of the International Searching Authority in International Patent Application No. PCT/CN2008/071181 (Sep. 11, 2008).
International Telecommunication Union (ITU), "Packet-Based Multimedia Communications Systems," Series H: Audiovisual and Multimedia Systems, Infrastructure of Audiovisual Services—Systems and Terminal Equipment for Audiovisual Services, Recommendation H.323 (Jul. 2003).

(Continued)

*Primary Examiner* — Quoc D Tran (57) ABSTRACT

A multi-media equipment controlling system, a device and method for controlling data transmission and processing are disclosed. Controlling data corresponding to multiple media type streams is sent to a controlled terminal equipment, the controlled terminal equipment controls multi-media equipments generating corresponding media type stream respectively, according to the controlling data corresponding to the media type streams. Thus the invention can perform corresponding controlling to the multi-media equipments corresponding to the multiple media type streams.

8 Claims, 4 Drawing Sheets

OTHER PUBLICATIONS

Network Working Group, "SIP: Session Initiation Protocol," Request for Comments: 3261, Memo, Copyright (c) The Internet Society (Jun. 2002).

"Extended European Search Report," in corresponding European Patent Application No. PCT/CN2008071181 (Sep. 16, 2010).

"H.323—Packet-based multimedia communications systems," Jun. 2006, International Telecommunication Union, Geneva, Switzerland.

Rosenberg et al., "SIP: Session Initiation Protocol," Jun. 2002, Reston, USA.

1st Office Action in corresponding European Application No. 08757592.4 (Feb. 18, 2011).

2nd Office Action in corresponding Chinese Patent Application No. 200710110572.5 (May 5, 2011).

3rd Office Action in corresponding Chinese Patent Application No. 200710110572.5 (Mar. 7, 2012).

Oral Proceedings issued in corresponding EP application No. 08757592.4, dated Jan. 11, 2013, total 5 pages.

* cited by examiner

FIG. 1 after receiving multiple media type streams sent by a controlled terminal equipment, a controlling terminal equipment maps controlling data corresponding to the media type streams to multiple controlling channels, and transmits the controlling data to the controlled terminal equipment.  S101 the controlled terminal equipment controls multi-media equipments generating the media type streams, respectively, according to the controlling data corresponding to the media type streams.  S102

| after receiving multiple media type streams sent by a controlled terminal equipment, a controlling terminal equipment transmits multiple controlling data carrying attribute description information corresponding to the media type streams to the controlled terminal equipment, through a controlling channel. | S201 |
|---|---|
| the controlled terminal equipment controls the multi-media equipments generating the media type streams, according to the controlling data corresponding to the media type streams. | S202 |

| after receiving multiple media type streams sent by a controlled terminal equipment, a controlling terminal equipment transmits multiple controlling data carrying attribute description information corresponding to the media type stream to the controlled terminal equipment, through a controlling channel. | S301 |

↓

| the MCU selects a media type stream to be controlled and description information of the controlled terminal equipment, according to attribute description information in the controlling data, determines the controlled terminal equipment according to the description information of the controlled terminal equipment, and sends the controlling data to the controlled terminal equipment. | S302 |

↓

| the controlled terminal equipment controls the multi-media equipments generating the media type streams, according to the controlling data. | S303 |

MULTI-MEDIA CONTROLLING SYSTEM, DEVICE AND METHOD FOR CONTROLLING DATA TRANSMISSION AND PROCESSING

CROSS-REFERENCE TO RELATED APPLICATIONS

This application is a continuation of International Application No. PCT/CN2008/071181, filed on Jun. 4, 2008, which claims priority to Chinese Patent Application No. 200710110572.5, filed on Jun. 5, 2007, both of which are hereby incorporated by reference in their entireties.

FIELD OF THE INVENTION

The present invention relates to the communication field, and particularly, to the control of multi-media equipment.

BACKGROUND

In the H.323 video conference system, each of the terminal equipments in the conference site collects various media type streams through respective multi-media equipments, such as main camera and auxiliary camera. Each of the terminal equipments transmits the collected multiple media type streams to an opposite terminal by a method of one logic channel for one type of media type streams; or the collected multiple media type streams are transmitted to a Multipoint Conference Unit (MCU), then several or all of them are combined into one channel of stream through the MCU and transmitted to the terminal equipments.

After acquiring the multiple media type streams transmitted from the opposite terminal, the terminal equipments require to control the remote multi-media equipment according to playing effect of the multiple media type streams.

Figure 1:
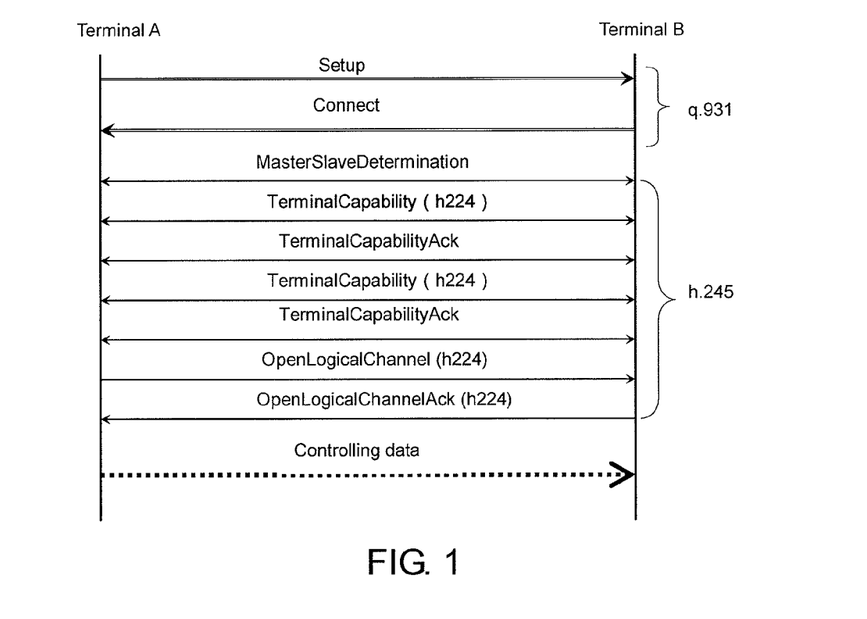
FIG. 1 is a flow chart for controlling a camera in the conventional art.

The conventional art related to the present invention provides a method for a terminal equipment A to control a mainstream camera of a terminal equipment B based on the H.323 protocol, and the implementing process is shown in FIG. 1. The terminal equipment A and the terminal equipment B establish a connection by a calling establishing message; after the connection is established, the terminal equipment A and the terminal equipment B declare through Capability Set message such as TerminalCapabilitySet message of H.245, that they each have the H.224 capability of supporting remote camera control; an H.224 control channel is established between the terminal equipment A and the terminal equipment B by signaling such like for opening the control channel; the terminal equipment A transmits controlling data to the terminal equipment B through the control channel, and the terminal equipment B operates its mainstream camera according to the controlling data, so as to implement the process that the terminal equipment A controls the mainstream camera of the terminal equipment B.

The conventional art is only applicable to the where the controlling data is transmitted through a controlling channel after a type of media type stream is received through a logical channel, and a terminal equipment having received the controlling data controls corresponding multi-media equipment according to the controlling data. But when some terminal equipment receives multiple media type streams through multiple logical channels and transmits the controlling data through one controlling channel, the some terminal equipment having received the controlling data cannot determine which multiple media type stream corresponds to the controlling data, and hence cannot determine multi-media equipment generating the media type stream to be controlled.

In addition, for joining in the multipoint conference held by the MCU, because the streams sent to the terminal equipment by the MCU correspond to multiple pictures, the terminal equipment cannot determine to which picture the control stream received according to the conventional method corresponds, and hence cannot control the multi-media equipment that generate the stream.

SUMMARY OF THE INVENTION

Various embodiments of the present invention provide a multi-media equipment controlling method and system, a device and method for controlling data transmission and processing, so as to control multi-media equipments corresponding to multi-media streams, respectively.

The embodiments of the present invention are implemented through the following technical solutions:

One embodiment of the present invention provides a multi-media equipment controlling system. The system includes: a controlling terminal equipment and a controlled terminal equipment. The controlling terminal equipment is configured to send controlling data corresponding to multiple media type streams to the controlled terminal equipment. The controlled terminal equipment is configured to control multi-media equipments generating the media type streams corresponding to the controlled terminal equipment, according to the controlling data corresponding to the multiple media type streams.

One embodiment of the present invention also provides a controlling data transmission method. The method includes: after receiving multiple media type streams sent by controlled terminal equipment, sending controlling data corresponding to the multiple media type streams to the controlled terminal equipment.

One embodiment of the present invention also provides a controlling data transmission device. The device includes: a first data mapping unit configured to map controlling data corresponding to multiple media type streams sent by controlled terminal equipment to multiple controlling channels; and a first data transmission unit configured to transmit the controlling data mapped to the controlling channels to the controlled terminal equipment through the controlling channels.

One embodiment of the present invention also provides another controlling data transmission device. The device includes: a second data mapping unit configured to map multiple controlling data carrying attribute description information corresponding to media type streams sent by controlled terminal equipment to a controlling channel; and a second data transmission unit configured to transmit the controlling data mapped to the controlling channel to the controlled terminal equipment via the controlling channel.

One embodiment of the present invention also provides a controlling data processing method. The method includes: acquiring controlling data corresponding to multiple media type streams, and controlling multi-media equipments generating the media type streams according to the controlling data.

One embodiment of the present invention also provides a controlling data processing device. The device includes: a controlling data acquiring unit configured to acquire controlling data corresponding to multiple media type streams; and a controlling unit configured to control multi-media equipments generating the media type streams according to the controlling data, wherein the controlling data acquiring unit comprising: a first acquiring unit configured to acquire controlling data corresponding to the multiple media type streams of the controlled terminal equipment, from multiple controlling channels; or, a second acquiring unit configured to acquire multiple controlling data carrying attribute description information corresponding to the media type streams of the controlled terminal equipment from a controlling channel.

One embodiment of the present invention also provides a controlling data proxy device. The device includes: a first acquiring unit configured to acquire controlling data carrying attribute description information corresponding to media type streams of a controlled terminal equipment, from a controlling channel; and a first transmission unit configured to determine the controlled terminal equipment according to the attribute description information, and send the controlling data corresponding to each media type stream to the controlled terminal equipment, through the controlling channel corresponding to each media type stream, or configured to determine the controlled terminal equipment according to the attribute description information, and send the controlling data to the controlled terminal equipment through a controlling channel One embodiment of the present invention also provides another controlling data proxy device. The device includes: a second acquiring unit configured to acquire controlling data corresponding to multiple media type streams of a controlled terminal equipment from multiple controlling channels; and a second transmission unit configured to describe the controlled terminal equipment and its media type streams corresponding to the controlling data with attribute description information, and transmit controlling data carrying the attribute description information through a controlling channel, or, configured to transmit the controlling data acquired by the second acquiring unit through multiple controlling channels corresponding to the media type streams.

As can be seen from the above technical solutions, according to the embodiments of the present invention, controlling data corresponding to multiple media type streams may be sent to the controlled terminal equipment, so as to control multi-media equipments corresponding to the multiple media type streams respectively.

DETAILED DESCRIPTION OF THE PREFERRED EMBODIMENTS

Figure 2:
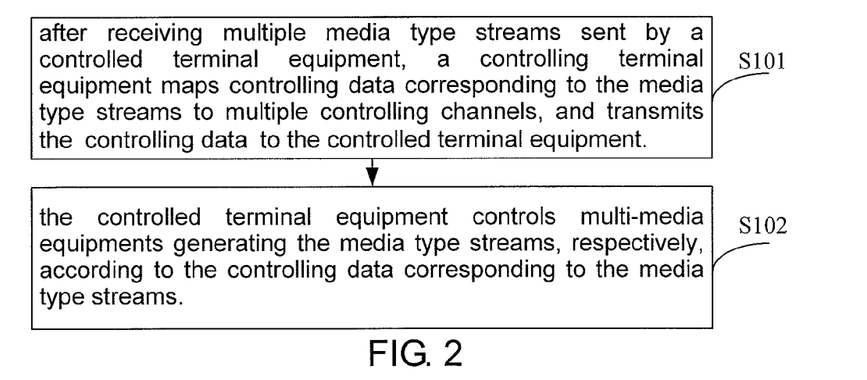
FIG. 2 is a flow chart of a first embodiment of the present invention.

The first embodiment of the present invention provides a multi-media equipment controlling method that opens an H.224 channel for each multi-media equipment to be controlled, respectively, controls transmission of controlling data of one multi-media equipment in a controlling channel, and controls transmission of controlling data of another multi-media equipment in another controlling channel. The detailed implementing process shown in FIG. 2 is as follows:

Step S101: After receiving multiple media type streams sent by a controlled terminal equipment, a controlling terminal equipment maps controlling data corresponding to the media type streams to multiple controlling channels, and transmits the controlling data to the controlled terminal equipment. The media type streams include: media type stream generated by a main multi-media equipment, and media type stream generated by an auxiliary multi-media equipment.

Step S102: The controlled terminal equipment controls the multi-media equipments generating the media type streams, respectively, according to the controlling data corresponding to the media type streams.

The controlled terminal equipment acquires controlling data corresponding to the multiple media type streams from the controlling channels, respectively, and controls the multi-media equipments generating the media type streams, respectively, according to the controlling data.

Figure 3:
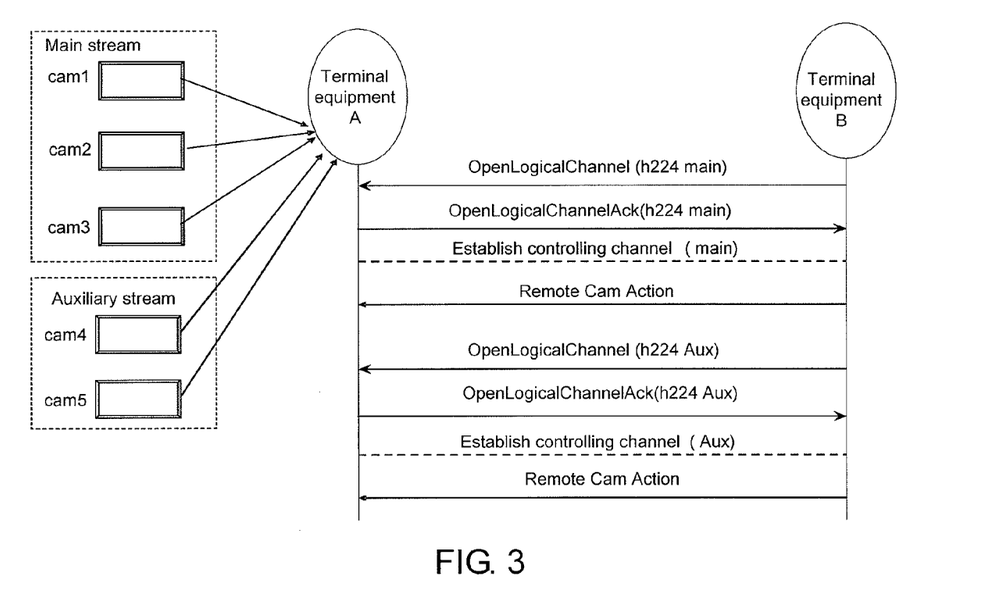
FIG. 3 is a flow chart illustrating a control of a camera of terminal equipment B by terminal equipment A in the first embodiment of the present invention.

The first embodiment of the present invention is illustrated in detail as follows. As shown in FIG. 3, assuming that the controlling terminal equipment is a terminal equipment A that supports video sources inputted by three cameras as main streams, i.e. cam1/cam2/cam3 in the figure; the controlled terminal equipment is a terminal equipment B that supports video sources inputted by two cameras as auxiliary streams, i.e., cam4/cam5 in the figure. Assuming the video stream inputted by the mainstream camera of the terminal equipment B to be controlled by the terminal equipment A as cam1, the video stream inputted by the auxiliary stream camera of the terminal equipment B as cam4, the detailed implementing process is as follows:

The terminal equipment A and the terminal equipment B establish a connection by a calling establishing message; after the connection is established, the terminal equipment A and the terminal equipment B declare they themselves through a CapabilitySet message such as TerminalCapabilitySet message of H.245, that they have the H.224 capability of supporting remote multi-media equipment control.

An H.224 control channel is established between the terminal equipment A and the terminal equipment B by signaling for establishing the control channel, for each multi-media equipment to be controlled; e.g. two controlling channels are established, one is an H.224 main channel that is utilized to transmit controlling data for controlling the mainstream camera cam1, the other is an H.224 auxiliary channel that is utilized to transmit controlling data for controlling the auxiliary stream camera cam4.

The terminal equipment A transmits controlling data for controlling the video stream cam 1 inputted by the mainstream camera to the terminal equipment B, through the H.224 main channel; and transmits controlling data for controlling the video stream cam4 inputted by the auxiliary stream camera to the terminal equipment B, through the H.224 auxiliary channel.

After receiving the controlling data from the H.224 main channel, the terminal equipment B controls the mainstream camera that generates cam1 according to the controlling data, so as to control the video stream cam1 inputted by its mainstream camera. After receiving controlling data from the H.224 auxiliary channel, the terminal equipment B controls the auxiliary stream camera that generates cam4 according to the controlling data, so as to control the video stream cam4 inputted by its auxiliary stream camera.

A multi-point conference may be further implemented based on the first embodiment of the present invention. The MCU acquires controlling data corresponding to the multiple media type streams of the controlled terminal equipment from multiple controlling channels; and transmits the controlling data to the controlled terminal equipment through the corresponding multiple controlling channels. Other illustrations are same as that of the first embodiment, and are not described in detail herein.

Figure 4:
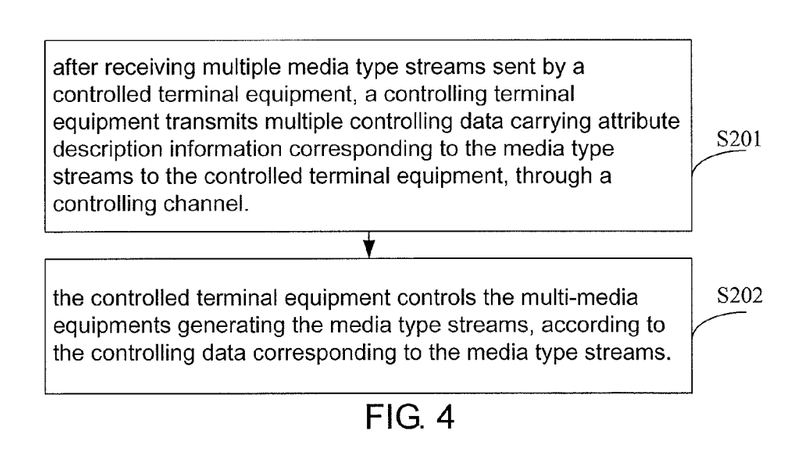
FIG. 4 is a flow chart of a second embodiment of the present invention.

The second embodiment of the present invention provides another multi-media equipment controlling method that adds attribute description information corresponding to the multi-media equipment to be controlled to the controlling data, by extending the H.281 protocol. The detailed implementing process shown in FIG. 4 is as follows:

Step S201: After receiving multiple media type streams sent by a controlled terminal equipment, a controlling terminal equipment transmits multiple controlling data carrying attribute description information corresponding to the media type streams to the controlled terminal equipment, through a controlling channel.

The attribute description information includes media type streams and description information of the controlled terminal equipment. The media type streams include: media type stream generated by a main multi-media equipment and media type stream generated by an auxiliary multi-media equipment.

Step S202: The controlled terminal equipment controls the multi-media equipments generating the media type streams, according to the controlling data corresponding to the media type streams.

The controlled terminal equipment acquires controlling data from a controlling channel, and acquires controlling data corresponding to its media type streams according to the attribute description information carried in the controlling data, e.g., determines whether itself is to be controlled according to the description information of controlled terminal equipment carried in the controlling data, and if itself is to be controlled, further determines a multi-media equipment generating the media type stream to be controlled, according to the media type stream carried in the controlling data; and controls the multi-media equipment generating the media type stream corresponding to the controlled terminal equipment, according to the controlling data.

The second embodiment of the present invention is detailed as follows.

Figure 5:
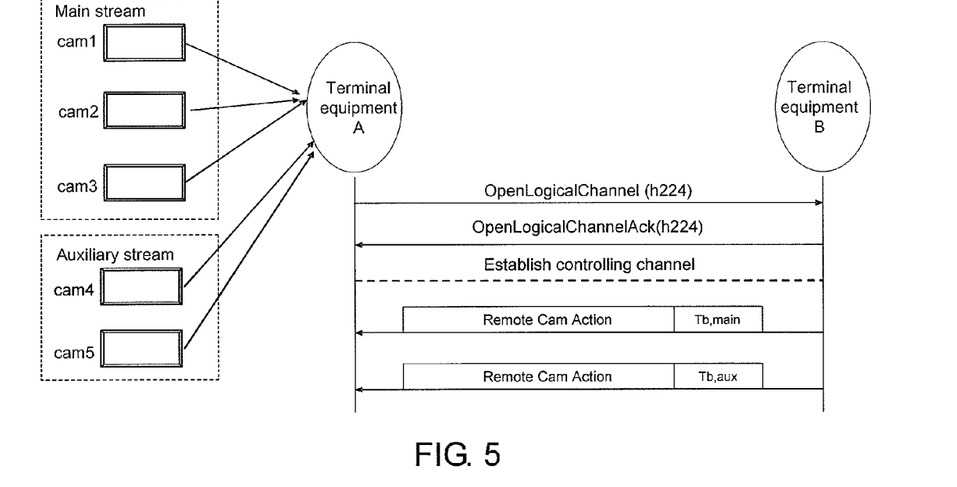
FIG. 5 is a flow chart illustrating a control of a camera of terminal equipment B by terminal equipment A in the second embodiment of the present invention.

As shown in FIG. 5, assuming that the controlling terminal equipment is a terminal equipment A that supports video sources inputted by three cameras as main streams, i.e., cam1/cam2/cam3 in the figure; the controlled terminal equipment is a terminal equipment B that supports video sources inputted by two cameras as auxiliary streams, i.e., cam4/cam 5 in the figure. Assuming the video stream inputted by the mainstream camera of the terminal equipment B to be controlled by the terminal equipment A as cam1, the video stream inputted by the auxiliary stream camera of the terminal equipment B as cam4, the detailed implementing process is as follows:

The terminal equipment A and the terminal equipment B establish a connection by a calling establishing message; after the connection is established, the terminal equipment A and the terminal equipment B declare they themselves through a CapabilitySet message such as TerminalCapabilitySet message of H.245, that they have the H.224 capability of supporting remote multi-media equipment control.

A same H.224 control channel is established between the terminal equipment A and the terminal equipment B by signaling for establishing the control channel, for different multi-media equipments to be controlled.

The terminal equipment A transmits controlling data carrying different attribute description information to the terminal equipment B, through the same one controlling channel. For example, when the terminal equipment A wants to control a video stream 'main' inputted by the mainstream camera of the terminal equipment B, <Tb, main> shall be filled in an extension field of the controlling data to be sent, indicating that the media type stream to be controlled is the video stream 'main' inputted by the mainstream camera, and the controlled terminal equipment is the terminal equipment B. After receiving the controlling data, the terminal equipment B parses that the controlled terminal equipment is itself, and parses that the media type stream to be controlled is the video stream 'main' generated by the mainstream camera, thus the terminal equipment B operates its mainstream camera according to the controlling data, so as to implement the control of a video stream inputted by the mainstream camera of the terminal equipment B by the terminal equipment A.

When the terminal equipment A wants to control a video stream inputted by the auxiliary stream camera of the terminal equipment B, <Tb, aux> shall be filled in an extension field of the controlling data to be sent, indicating that a video stream 'aux' inputted by the auxiliary stream camera of the terminal equipment B is to be controlled. After receiving the controlling data, the terminal equipment B parses that the controlled terminal equipment is itself, and parses that the media type stream to be controlled is the video stream 'aux' inputted by the auxiliary stream camera, thus the terminal equipment B operates its auxiliary stream camera according to the controlling data, so as to implement the control of a video stream inputted by the auxiliary stream camera of the terminal equipment B by the terminal equipment A.

Figure 6:
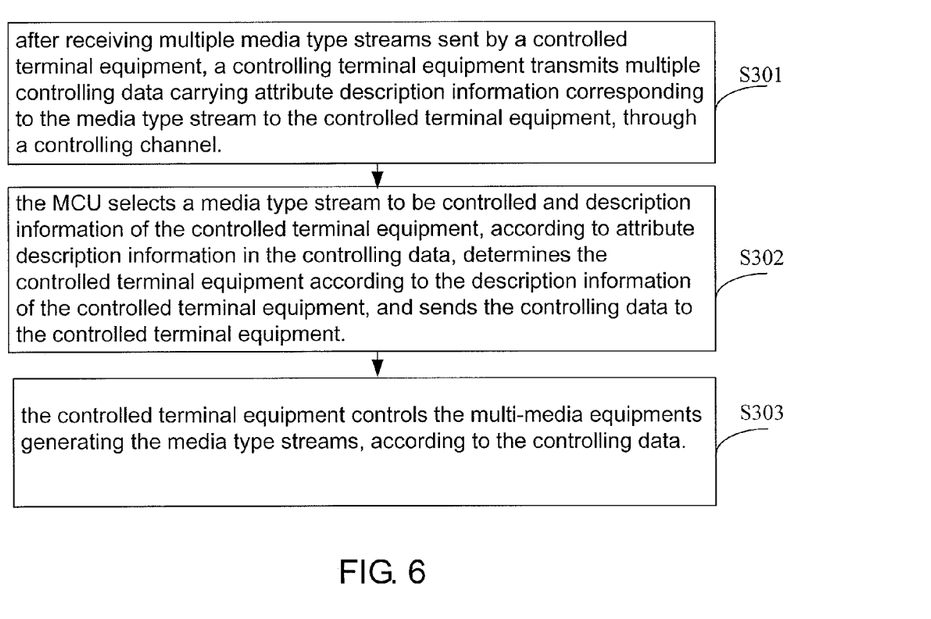
FIG. 6 is a flow chart of a third embodiment of the present invention.

The third embodiment of the present invention provides a third multi-media equipment controlling method that further implements the multi-point conference based on the second embodiment, and the detailed implementing process shown in FIG. 6 is as follows:

Step S301: After receiving multiple media type streams sent by a controlled terminal equipment, a controlling terminal equipment transmits multiple controlling data carrying attribute description information corresponding to the media type streams to the controlled terminal equipment, through a controlling channel.

The attribute description information includes media type streams and description information of the controlled terminal equipment. The media type streams include media type stream generated by a main multi-media equipment and media type stream generated by an auxiliary multi-media equipment.

Step S302: The controlling data sent to the controlled terminal equipment arrives at an MCU, the MCU selects a media type stream to be controlled and description information of the controlled terminal equipment, according to attribute description information in the controlling data, determines the controlled terminal equipment according to the description information of the controlled terminal equipment, and sends the controlling data to the controlled terminal equipment.

Step S303: After acquiring the controlling data carrying the attribute description information, the controlled terminal equipment controls the multi-media equipment generating the media type stream according to the controlling data.

The controlled terminal equipment acquires controlling data from a controlling channel, and acquires controlling data corresponding to its media type streams according to the attribute description information carried in the controlling data, e.g. determines whether itself is to be controlled according to the description information of controlled terminal equipment carried in the controlling data, and if itself is to be controlled, further determines a multi-media equipment generating the media type stream to be controlled, according to the media type stream carried in the controlling data; and controls the multi-media equipment generating the media type stream corresponding to the controlled terminal equipment, according to the controlling data.

The third embodiment of the present invention is detailed as follows.

Figure 7:
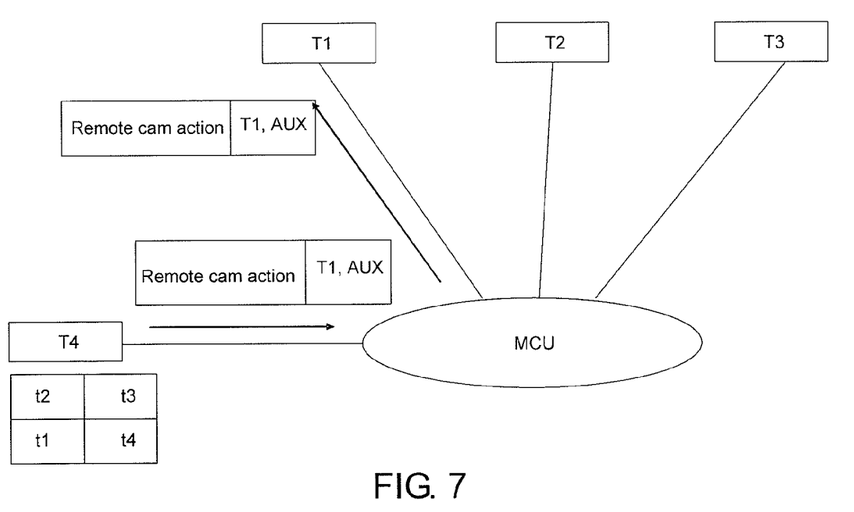
FIG. 7 is a flow chart illustrating a control of a camera of terminal equipment B by terminal equipment A during multipoint conference in the third embodiment of the present invention.

As shown in FIG. 7, assuming that the terminal equipment initiating the control can view the scenes of four conference sites t1/t2/t3/t4 simultaneously during the multi-point conference, a terminal equipment T4 joins in the multi-point conference, and the MCU sends video streams corresponding to pictures of the four conference sites t1/t2/t3/t4 to the terminal equipment T4. According to the viewed pictures of the four conference sites t1/t2/t3/t4, and assuming that the terminal equipment T4 controls a video stream "Aux" corresponding to the t1 sub-picture, <T1, Aux> shall be filled in an extension field to indicate that the video stream "Aux" inputted by the auxiliary stream camera of the terminal equipment T1 is to be controlled. After receiving the controlling data of the camera, the MCU parses that the video stream "Aux" inputted by the auxiliary stream camera of the terminal equipment T1 is to be controlled, and then sends the controlling data to the terminal equipment T1; after receiving the controlling data, the terminal equipment, T1 parses that the media type stream to be controlled is the video stream "Aux" inputted by its auxiliary stream camera, and then controls the auxiliary stream camera according to the controlling data, so as to implement the control of a video stream inputted by the auxiliary stream camera of the terminal equipment T1 by the terminal equipment T4.

The above three embodiments only give the condition that both communication parties simultaneously support sending or receiving controlling data corresponding to multiple media type streams through one controlling channel, and the condition that both communication parties simultaneously support sending or receiving controlling data corresponding to multiple media type streams through multiple controlling channels. But when the communication parties support different functions, a network equipment, such as the MCU, is required to perform a conversion, the details are as follows.

When the controlling terminal equipment supports sending controlling data corresponding to multiple media type streams through multiple controlling channels, and the controlled terminal equipment supports receiving controlling data corresponding to multiple media type streams through one controlling channel, the MCU acquires controlling data corresponding to the multiple media type streams of the controlled terminal equipment from the multiple controlling channels; describes the controlled terminal equipment and its media type streams corresponding to the controlling data with attribute description information; and transmits the controlling data carrying the attribute description information through a controlling channel.

When the controlling terminal equipment supports sending controlling data corresponding to multiple media type streams through one controlling channel, and the controlled terminal equipment supports receiving controlling data corresponding to multiple media type streams through multiple controlling channels, the MCU acquires controlling data carrying attribute description information corresponding to the media type streams of the controlled terminal equipment; determines the controlled terminal equipment according to the attribute description information, deletes the attribute description information from the controlling data, and sends controlling data without the attribute description information and corresponding to each media type stream to the controlled terminal equipment, through the controlling channel corresponding to each media type stream. The attribute description information may also be reserved in the controlling data, and controlling data corresponding to each media type stream is sent to the controlled terminal equipment, through the controlling channel corresponding to each media type stream.

Figure 8:
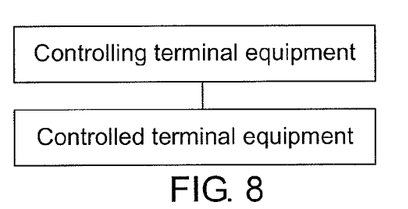
FIG. 8 is a structure principle diagram of a fourth embodiment of the present invention.

The fourth embodiment of the present invention provides a multi-media equipment controlling system whose structure is shown in FIG. 8. The system includes: a controlling terminal equipment and a controlled terminal equipment. The controlling terminal equipment includes a first transmission unit or a second transmission unit.

The relationship of signal transmission between the units is as follows:

The controlling terminal equipment receives multiple media type streams sent by the controlled terminal equipment, and sends controlling data corresponding to the multiple media type streams to the controlled terminal equipment, after receiving the multiple media type streams sent by the controlled terminal equipment. In detail, controlling data corresponding to each media type stream is mapped to a controlling channel through the first transmission unit, thus the controlling data corresponding to the multiple media type streams are transmitted to the controlled terminal equipment through multiple controlling channels; or, various controlling data carrying attribute description information corresponding to the media type streams are transmitted to the controlled terminal equipment through a controlling channel by the second transmission unit. The attribute description information includes media type streams and description information of the controlled terminal equipment. The media type streams include: media type stream generated by a main multi-media equipment, and media type stream generated by an auxiliary multi-media equipment. The detailed implementation is same as that of the previous embodiments, and herein is not described in detail.

After receiving the controlling data, the controlled terminal equipment controls its multi-media equipments that generate the media type streams, according to the controlling data corresponding to the media type streams.

The fifth embodiment of the present invention provides another multi-media equipment controlling system, in which a first controlling data proxy device is added for controlling data proxy based on the fourth embodiment. When controlling data sent to the controlled terminal equipment arrives at the first controlling data proxy device, the first controlling data proxy device acquires controlling data corresponding to the multiple media type streams of the controlled terminal equipment from multiple controlling channels, and transmits the controlling data to the controlled terminal equipment through the corresponding multiple controlling channels. Other implementation is same as that of the fourth embodiment, and are not described in detail herein.

The fifth embodiment of the present invention is applicable to the case where both communication parties simultaneously support sending or receiving controlling data corresponding to multiple media type streams through multiple controlling channels.

The first controlling data proxy device in the fifth embodiment of the present invention may be replaced by a second controlling data proxy device that acquires controlling data corresponding to the multiple media type streams of a controlled terminal equipment through multiple controlling channels, describes the controlled terminal equipment and its media type streams corresponding to the controlling data with attribute description information, and transmits the controlling data carrying the attribute description information through a controlling channel.

At that time, the system is applicable to the case where one communication party supports sending or receiving controlling data corresponding to multiple media type streams through multiple controlling channels, and the other communication party supports sending or receiving controlling data corresponding to multiple media type streams through one controlling channel.

The first controlling data proxy device in the fifth embodiment of the present invention may be replaced by a third controlling data proxy device that acquires controlling data through one controlling channel, determines a controlled terminal equipment according to the attribute description information in the controlling data, and transmits the controlling data to the controlled terminal equipment through a controlling channel.

At that time, the system is applicable to case where both communication parties simultaneously support sending or receiving controlling data corresponding to multiple media type streams through one controlling channel.

The first controlling data proxy device in the fifth embodiment of the present invention may be replaced by a fourth controlling data proxy device that acquires controlling data carrying attribute description information corresponding to media type streams of the controlled terminal equipment through one controlling channel, determines a controlled terminal equipment according to the attribute description information, deletes the attribute description information from the controlling data, and sends controlling data without the attribute description information and corresponding to each media type stream to the controlled terminal equipment, through the controlling channel corresponding to each media type stream. Or, the attribute description information may be reserved in the controlling data, and controlling data corresponding to each media type stream is sent to the controlled terminal equipment, through the controlling channel corresponding to each media type stream.

At that time, the system is adaptable to the condition that one communication party supports sending or receiving controlling data corresponding to multiple media type streams through one controlling channel, and the other communication party supports sending or receiving controlling data corresponding to multiple media type streams through multiple controlling channels.

The sixth embodiment of the present invention provides a controlling data transmission method where controlling data corresponding to different media type streams is transmitted to a controlled terminal equipment, and in detail, it can be implemented in two solutions:

The first solution: after receiving multiple media type streams sent by a controlled terminal equipment, a controlling terminal equipment maps controlling data corresponding to the multiple media type streams to multiple controlling channels and then transmits the controlling data to the controlled terminal equipment. The detailed implementing process is same as that in the first embodiment, and herein is not described in detail.

The second solution: after receiving multiple media type streams sent by a controlled terminal equipment, a controlling terminal equipment transmits multiple controlling data carrying attribute description information corresponding to the media type streams to the controlled terminal equipment, through a controlling channel. The attribute description information includes media type streams and description information of the controlled terminal equipment. The media type streams include media type stream generated by a main multimedia equipment and media type stream generated by an auxiliary multi-media equipment. The detailed implementing process is the same as that in the second embodiment, and is not described in detail herein.

The method is also applicable to the case where an MCU is added.

With respect to the first solution, when the controlling data sent to the controlled terminal equipment arrives at the MCU, the MCU acquires controlling data corresponding to multiple media type streams of the controlled terminal equipment from multiple controlling channels, and transmits the controlling data through the corresponding multiple controlling channels; or the MCU acquires controlling data corresponding to multiple media type streams of the controlled terminal equipment from multiple controlling channels, describes the controlled terminal equipment and its media type streams corresponding to the controlling data with attribute description information, and transmits the controlling data carrying the attribute description information through a controlling channel.

With respect to the second solution, when the controlling data sent to the controlled terminal equipment arrives at the MCU, the MCU acquires controlling data carrying attribute description information corresponding to the media type streams of a controlled terminal equipment through a controlling channel; determines the controlled terminal equipment according to the attribute description information carried in the controlling data; and transmits the controlling data to the controlled terminal equipment through a controlling channel; or the MCU acquires controlling data carrying attribute description information corresponding to the media type streams of a controlled terminal equipment through a controlling channel; determines the controlled terminal equipment according to the attribute description information, deletes the attribute description information from the controlling data, and sends controlling data without the attribute description information and corresponding to each media type stream to the controlled terminal equipment, through the controlling channel corresponding to each media type stream. The attribute description information also can be reserved in the controlling data, and controlling data corresponding to each media type stream is sent to the controlled terminal equipment, through the controlling channel corresponding to each media type stream.

The attribute description information determines a controlled terminal equipment, and the controlling data is sent to the controlled terminal equipment. The detailed implementation is the same as that in the third embodiment, and herein is not described in detail.

Figure 9:
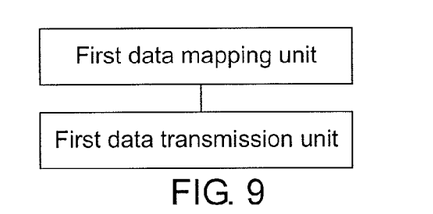
FIG. 9 is a structure principle diagram of a seventh embodiment of the present invention.

The seventh embodiment of the present invention provides a controlling data transmission device whose structure is shown in FIG. 9. The device includes: a first data mapping unit and a first data transmission unit.

The signal transmission relationship between the units is as follows:

The first data mapping unit maps controlling data corresponding to multiple media type streams sent by a controlled terminal equipment to multiple controlling channels. The media type streams include: media type stream generated by a main multi-media equipment, and media type stream generated by an auxiliary multi-media equipment.

The first data transmission unit transmits the controlling data mapped to the controlling channels to the controlled terminal equipment through the controlling channels.

Figure 10:
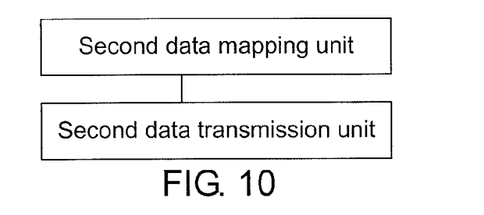
FIG. 10 is a structure principle diagram of an eighth embodiment of the present invention.

The eighth embodiment of the present invention provides another controlling data transmission device whose structure is shown in FIG. 10. The device includes: a second data mapping unit and a second data transmission unit.

The second data mapping unit maps multiple controlling data carrying attribute description information corresponding to the media type streams sent by the controlled terminal equipment to a controlling channel. The attribute description information includes: media type streams and description information of the controlled terminal equipment. The media type streams include: media type stream generated by a main multi-media equipment, and media type stream generated by an auxiliary multi-media equipment.

The second data transmission unit transmits the controlling data mapped to the controlling channel to the controlled terminal equipment through the controlling channel.

The ninth embodiment of the present invention provides a controlling data processing method, including: acquiring controlling data corresponding to multiple media type streams, and controlling multi-media equipments generating the media type streams according to the controlling data. Acquiring the controlling data corresponding to the multiple media type streams may be acquiring controlling data corresponding to the multiple media type streams through multiple controlling channels, or acquiring controlling data carrying attribute description information corresponding to the media type streams through a controlling channel. The detailed implementing process is the same as that in the previous embodiments, and is not described in detail herein.

The method in the ninth embodiment is also applicable to the case where that an MCU is added.

When the controlling data sent to the controlled terminal equipment arrives at the MCU, the MCU acquires controlling data carrying attribute description information corresponding to the media type streams of a controlled terminal equipment through one controlling channel, determines the controlled terminal equipment according to the attribute description information carried in the controlling data sent to the controlled terminal equipment, and transmits the controlling data to the controlled terminal equipment through a controlling channel; or the MCU acquires controlling data corresponding to the multiple media type streams of the controlled terminal equipment from multiple controlling channels, describes the controlled terminal equipment and its media type streams corresponding to the controlling data with attribute description information; and transmits the controlling data carrying the attribute description information to the controlled terminal equipment through a controlling channel.

The tenth embodiment of the present invention provides a controlling data processing device. The device includes: a controlling data acquiring unit and a controlling unit. The controlling data acquiring unit includes a first acquiring subunit or a second acquiring subunit.

The controlling data acquiring unit is configured to acquire controlling data corresponding to multiple media type streams, and the detailed process is as follows: the first acquiring subunit acquires controlling data corresponding to the multiple media type streams through multiple controlling channels. The detailed processing is the same as that in the method embodiment, and herein is not described in detail.

The controlling unit controls multi-media equipments generating the media type streams, respectively, according to the controlling data acquired by the controlling data acquiring unit.

The eleventh embodiment of the present invention provides a controlling data processing device. The device includes: a controlling data acquiring unit and a controlling unit. The controlling data acquiring unit includes a second acquiring subunit.

The controlling data acquiring unit acquires controlling data corresponding to the multiple media type streams, and the detailed processing condition is as follows: the second acquiring subunit acquires multiple controlling data carrying attribute description information corresponding to the media type streams of the controlled terminal equipment, through one controlling channel. The detailed processing is the same as that in the method embodiments, and is not described in detail herein.

The controlling unit controls multi-media equipments generating the media type streams according to the controlling data acquired by the controlling data acquiring unit.

The twelfth embodiment of the present invention provides a controlling data proxy device. The device includes: a first acquiring unit and a first transmission unit.

The first acquiring unit acquires controlling data carrying attribute description information corresponding to the media type streams of the controlled terminal equipment, through a controlling channel. The attribute description information includes media type streams and description information of the controlled terminal equipment. The media type streams include media type stream generated by a main multi-media equipment and media type stream generated by an auxiliary multi-media equipment.

The first transmission unit determines a controlled terminal equipment according to the attribute description information, deletes the attribute description information from the controlling data, and sends controlling data without the attribute description information and corresponding to each media type stream to the controlled terminal equipment, through the controlling channel corresponding to each media type stream. The attribute description information may also be reserved in the controlling data, and controlling data corresponding to each media type stream is sent to the controlled terminal equipment, through the controlling channel corresponding to each media type stream. The controlling data can also be sent to the controlled terminal equipment through one controlling channel.

The controlling data proxy device may be an MCU, or any other gateway, and the processing condition is described as follows by taking an example that uses the MCU as the controlling data proxy device.

Assuming that two terminal equipments that are connected with the MCU join in a conference: a terminal equipment T1 only supports controlling main and auxiliary stream cameras through multiple camera controlling channels, and a terminal equipment T2 only supports carrying different attribute description information in controlling data transmitted through one camera controlling channel. The controlling channel of the main stream camera and the controlling channel of the auxiliary stream camera are opened respectively between T1 and MCU, while only one camera controlling channel is opened between T2 and MCU. When T2 wants to control the stream corresponding to the auxiliary stream camera of T1, T2 transmits controlling data carrying the attribute description information to the MCU, the first acquiring unit of the MCU acquires controlling data carrying attribute description information corresponding to the auxiliary stream camera of T1, from a controlling channel; according to the attribute description information, the first transmission unit determines that the controlled terminal equipment is T1, and the controlled stream is the stream corresponding to the auxiliary stream camera; deletes the attribute description information from the controlling data, and sends the controlling data without the attribute description information to the controlled terminal equipment T1, through a controlling channel opened for the stream of the auxiliary stream camera of T1. When T2 wants to control the stream corresponding to the main stream camera of T1, T2 transmits controlling data carrying the attribute description information to the MCU, the first acquiring unit of the MCU acquires controlling data carrying attribute description information corresponding to the main stream camera of T1, from a controlling channel; according to the attribute description information, the first transmission unit determines that the controlled terminal equipment is T1, and the controlled stream is the stream corresponding to the main stream camera; deletes the attribute description information from the controlling data, and sends controlling data without the attribute description information to the controlled terminal equipment T1, through a controlling channel opened for the stream of the main stream camera of T1.

The thirteenth embodiment of the present invention provides another controlling data proxy device. The device includes: a second acquiring unit and a second transmission unit.

The second acquiring unit is configured to acquire controlling data corresponding to the multiple media type streams of the controlled terminal equipment from multiple controlling channels.

The second transmission unit is configured to describe the controlled terminal equipment and its media type streams corresponding to the controlling data with attribute description information, and transmits controlling data carrying the attribute description information through a controlling channel. It can also transmit the controlling data acquired by the first acquiring unit through multiple controlling channels.

The controlling data proxy device may be an MCU, or any other gateway, and the processing condition is described as follows by taking an example that uses the MCU as the controlling data proxy device.

Assuming that two terminal equipments connected with the MCU join in a conference: a terminal equipment T1 only supports controlling main and auxiliary stream cameras through multiple camera controlling channels, and a terminal equipment T2 only supports carrying different attribute description information in controlling data transmitted through one camera controlling channel. T1 is viewing the picture of T2. When T1 wants to control the auxiliary stream camera of T2, the controlling channel of the main stream camera and the controlling channel of the auxiliary stream camera are opened respectively between T1 and MCU, while only one camera controlling channel is opened between T2 and MCU. T1 transmits controlling data corresponding to the stream of the main stream camera as well as controlling data corresponding to the stream of the auxiliary stream camera to the MCU through corresponding controlling channels; under such condition, the second acquiring unit of the MCU acquires controlling data corresponding to the multiple media type streams of the controlled terminal equipment T2 from multiple controlling channels; the second transmission unit of the MCU describes the controlled terminal equipment and its media type streams corresponding to the controlling data with attribute description information, e.g., using attribute description information <T2, Aux> to indicate that the stream corresponding to the auxiliary stream camera of the terminal equipment T2 is to be controlled, and using attribute description information <T2, Main> to indicate that the stream corresponding to the main stream camera of the terminal equipment T2 is to be controlled; and transmits controlling data carrying the attribute description information to T2 through a controlling channel; after receiving the controlling data, T2 parses the auxiliary stream camera of T2 is to be controlled from the attribute description information, and then controls the auxiliary stream camera of T2.

It can be seen from the above embodiments of the present invention that controlling data corresponding to multiple media type streams of the controlled terminal equipment can be sent to the controlled terminal equipment, so as to control the multi-media equipments corresponding to the multiple media type streams.

It will be apparent to those skilled in the art that various modifications and variation can be made in the present invention without departing from the scope of the invention. Thus, it is intended that the present invention cover the modifications and variations of this invention provided they come within the scope of the appended claims and their equivalents.

What is claimed is:

1. A multi-media network conference system comprising:
a first conference terminal and a second conference terminal, the second conference terminal having a plurality of multi-media devices connected thereto for generating media streams to be transmitted to the first conference terminal over a network; the first conference terminal being configured to establish a plurality of control channels over the network with the second conference terminal, each control channel being for a corresponding one of the multi-media devices of the second conference terminal, and transmit control data for each of the multi-media devices over a corresponding control channel to the second conference terminal;
the second conference terminal being configured to receive the control data transmitted over each control channel and operate the corresponding multi-media device according to the control data.

2. A multi-media network conference system comprising:
a first conference terminal and a second conference terminal, the second conference terminal having a plurality of multi-media devices connected thereto for generating media streams to be transmitted to the first conference terminal over a network;
the first conference terminal being configured to establish one control channel over the network with the second conference terminal and transmit control data for the plurality of multi-media devices over the control channel to the second conference terminal, the control data including attribute description information identifying media stream types corresponding to the multi-media devices,
the second conference terminal being configured to receive the control data transmitted over the control channel, identify one of the multi-media devices to be controlled based on the attribute description information, and operate the identified multi-media device according to the control data.

3. The system according to claim 2,
the attribute description information further comprising description information identifying the second conference terminal.

4. A method for conducting a multi-media network conference between a first conference terminal and a second conference terminal, the second conference terminal having a plurality of multi-media devices connected thereto for generating media streams for transmission over a network to the first conference terminal, the method comprising:
forming, by the second conference terminal, a plurality of control channels over the network with the first conference terminal; each control channel being for a corresponding one of the plurality of multi-media devices connected to the second conference terminal,
receiving, by the second conference terminal, from the first conference terminal, control data over each control channel for a corresponding multi-media device; and
operating, by the second conference terminal, the corresponding multi-media device according to the control data.

5. A method for conducting a multi-media network conference between a first conference terminal and a second conference terminal, the second conference terminal having a plurality of multi-media devices connected thereto for generating media streams for transmission over a network to the first conference terminal, the method comprising:
forming, by the second conference terminal, one control channel over the network with the first conference terminal;
receiving, by the second conference terminal from the first conference terminal, control data over the control channel for the plurality of multi-media devices;
the control data including attribute description information identifying media stream types corresponding to the multi-media devices;
identifying, by the second conference terminal, one of the multi-media devices to be controlled based on the attribute description information, and
operating, by the second conference terminal, the identified multi-media device according to the control data.

6. The method according to claim 5,
the attribute description information further comprising description information identifying the second conference terminal.

7. A multi-media network conference terminal comprising:
a control unit configured to connect with a plurality of multi-media devices for generating media streams to be transmitted to a first conference terminal over a network; form a plurality of control channels over the network with the first conference terminal, each control channel being for a corresponding one of the multi-media devices;
a control data acquiring unit configured to receive control data from the first conference terminal over the network transmitted over the control channels; and
the control unit further configured to operate the corresponding multi-media devices according to the control data.

8. A multi-media network conference terminal comprising:
a control unit configured to connect with a plurality of multi-media devices for generating media streams to be transmitted to a first conference terminal over a network; form one control channel over the network with the first conference terminal;
a first acquiring unit configured to receive control data over the control channel for the plurality of multi-media devices, the control data including attribute description information identifying media streams types corresponding to the multi-media devices, and identify one of the multi-media devices to be controlled based on
the attribute description information; and
the control unit further configured to operate the identified multi-media device according to the control data.

* * * * *